(12) United States Patent
Arrizon

(10) Patent No.: US 11,649,920 B2
(45) Date of Patent: May 16, 2023

(54) MOUNTING DEVICE FOR PORTABLE ELECTRONIC DEVICES

(71) Applicant: Arthur Arrizon, Hayward, CA (US)

(72) Inventor: Arthur Arrizon, Hayward, CA (US)

( * ) Notice: Subject to any disclaimer, the term of this patent is extended or adjusted under 35 U.S.C. 154(b) by 0 days.

(21) Appl. No.: 17/543,691

(22) Filed: Dec. 6, 2021

(65) Prior Publication Data
US 2022/0090731 A1 Mar. 24, 2022

Related U.S. Application Data

(63) Continuation of application No. 17/022,120, filed on Sep. 16, 2020, now abandoned.

(60) Provisional application No. 62/931,897, filed on Nov. 7, 2019.

(51) Int. Cl.
*F16M 11/14* (2006.01)
*F16M 11/04* (2006.01)
*F16M 11/40* (2006.01)

(52) U.S. Cl.
CPC .......... *F16M 11/14* (2013.01); *F16M 11/041* (2013.01); *F16M 11/046* (2013.01); *F16M 11/40* (2013.01); *F16M 2200/022* (2013.01)

(58) Field of Classification Search
CPC ...... F16M 11/14; F16M 11/041; F16M 11/28; F16M 2200/022; F16M 11/40; F16M 11/2078; F16M 11/046
See application file for complete search history.

(56) References Cited

U.S. PATENT DOCUMENTS

| | | | | |
|---|---|---|---|---|
| 3,870,264 A * | 3/1975 | Robinson | ........... | F16M 11/32 |
| | | | | 248/171 |
| 3,908,945 A * | 9/1975 | Shapiro | ........... | F16M 11/14 |
| | | | | 248/165 |
| 4,214,724 A * | 7/1980 | Geiger | ........... | F16M 11/22 |
| | | | | 248/167 |
| 5,161,766 A * | 11/1992 | Arima | ........... | A47B 23/02 |
| | | | | 248/458 |
| 6,349,905 B1 * | 2/2002 | Mills | ........... | F16M 11/28 |
| | | | | 248/278.1 |
| 6,540,184 B2 * | 4/2003 | Thaxton | ........... | B60R 11/06 |
| | | | | 248/316.4 |
| 7,005,568 B2 * | 2/2006 | Hsieh | ........... | F16M 11/2078 |
| | | | | 84/422.1 |
| 7,344,320 B2 * | 3/2008 | Barker | ........... | F16M 11/14 |
| | | | | 396/419 |
| 7,621,491 B2 * | 11/2009 | Law | ........... | F16M 11/38 |
| | | | | 248/168 |
| 7,684,694 B2 * | 3/2010 | Fromm | ........... | F16M 11/28 |

(Continued)

*Primary Examiner* — Bradley Duckworth
(74) *Attorney, Agent, or Firm* — Ashok Tankha

(57) ABSTRACT

A mounting device comprises an adjustable receptable, a first ball head, a second ball head, a telescopic pole, and a tripod. The first and second ball heads comprise a ball in rotatable communication with a casing within which the ball is disposed. The ball of the first ball head comprises a stem projecting out of an opening in the ball casing. The stem of the first ball head is attached to a base of the adjustable receptacle. A top end of the telescopic pole is attached to a base of the ball casing of the first ball head. The ball of the second ball head comprises a stem projecting out of an opening in the ball casing. The stem of the second ball head is in communication with the bottom end of the telescopic pole. The tripod is attached to a base of the casing of the second ball head.

13 Claims, 23 Drawing Sheets

(56) References Cited

U.S. PATENT DOCUMENTS

| | | | | |
|---|---|---|---|---|
| 7,798,452 B1* | 9/2010 | Wessells | ............... | F16M 11/10 |
| | | | | 248/163.1 |
| 7,905,667 B2* | 3/2011 | Barker | ................... | F16M 11/16 |
| | | | | 396/419 |
| 9,297,409 B2* | 3/2016 | Kallas | .................. | F16M 11/041 |
| 9,405,172 B2* | 8/2016 | Cunningham, III | ... | F16M 13/04 |
| 9,971,232 B2* | 5/2018 | Jeong | .................... | G03B 17/563 |
| 10,386,012 B2* | 8/2019 | Balmer | ................. | F16M 11/24 |
| 10,441,066 B2* | 10/2019 | Robinson | ............... | F16C 11/06 |
| 10,488,741 B2* | 11/2019 | Prichard | ............... | F16M 11/14 |
| 10,583,790 B2* | 3/2020 | Wang | ................... | F16M 13/00 |
| 10,999,570 B2* | 5/2021 | Banta | .................. | H04N 13/239 |
| 2008/0087789 A1* | 4/2008 | Haynes | ............... | F16M 13/022 |
| | | | | 248/458 |
| 2015/0008146 A1* | 1/2015 | Nash | ...................... | F16M 13/04 |
| | | | | 206/37 |
| 2015/0346590 A1* | 12/2015 | Lewis | ................... | F16M 11/28 |
| | | | | 294/139 |
| 2015/0358044 A1* | 12/2015 | Barstead | .............. | H04B 1/3888 |
| | | | | 455/575.1 |
| 2015/0374117 A1* | 12/2015 | Lozano | ................. | F16M 11/32 |
| | | | | 248/447.2 |
| 2016/0192774 A1* | 7/2016 | Hwang | ................. | F16M 11/00 |
| | | | | 248/445 |
| 2017/0086314 A1* | 3/2017 | Simon | ................... | F16M 11/28 |
| 2017/0251793 A1* | 9/2017 | Barratt | .................. | F16M 11/28 |
| 2017/0350555 A1* | 12/2017 | Jertson | .................. | F16M 11/16 |
| 2020/0116296 A1* | 4/2020 | Dunn | ..................... | F16M 11/14 |
| 2020/0124948 A1* | 4/2020 | Li | .......................... | F16M 11/34 |
| 2020/0166175 A1* | 5/2020 | Elias | ................... | G03B 17/561 |
| 2020/0362895 A1* | 11/2020 | Lin | ........................... | F16B 9/02 |

* cited by examiner

MOUNTING DEVICE FOR PORTABLE ELECTRONIC DEVICES

CROSS-REFERENCE TO RELATED APPLICATIONS

This application is a continuation application of non-provisional patent application Ser. No. 17/022,120 titled "Mounting Device For Portable Electronic Devices", filed in the United States Patent and Trademark Office on Sep. 16, 2020, which claims priority to and benefit of provisional patent application No. 62/931,897 titled "Smartphone Hands Free Stand", filed in the United States Patent and Trademark Office on Nov. 7, 2019. The specifications of the above referenced patent applications are incorporated herein by reference in their entirety.

BACKGROUND

Portable hand-held electronic devices are widely used across every segment of society. Almost every adult and teenager owns a portable hand-held electronic device. Portable hand-held electronic devices, hereafter referred to as electronic devices comprise smart phones, tablets, etc. An example of a smart phone is APPLE® IPHONE® These electronic devices which have sold millions of units across the world, are now relatively expensive. Users generally hold the electronic devices in their hand during use. To facilitate the handling of electronic devices during use, a large market has been created for a fixture, hereafter a mounting device, for mounting electronic devices during use. Mounting devices are generally fixed or placed on a surface when used with the electronic device.

An existing mounting device for electronic devices is designed to be affixed via a suction cup to a smooth, residue-free surface such as glass or plastic. Other variants of the mounting devices are designed to be attached to an object through a clamp or similar mechanism. However, during use, such existing mounting devices often allow the electronic device to disengage and fall off from the mounting device, or allow the mounting device to not remain attached to the surface on which the mounting device was attached. Furthermore, existing mounting devices are not designed to position the electronic device at a height or angle that is convenient for the user. Existing mounting devices are also not designed to be placed on an uneven surface. Therefore, for use on uneven surfaces, a user often holds the mounting device in one hand while using the electronic device with the other hand.

Therefore, there is a long felt but unresolved need for a mounting device that positions the electronic device at a height and angle that is convenient for the user. Furthermore, there is a long felt but unresolved need for a mounting device stand that can be secured on an even or an uneven surface to enable the user to use the electronic device in, for example, a sitting or a resting position over the even surface or the uneven surface.

SUMMARY OF THE INVENTION

This summary is provided to introduce a selection of concepts in a simplified form that are further disclosed in the detailed description of the invention. This summary is not intended to determine the scope of the claimed subject matter.

The mounting device disclosed herein positions the electronic device at a height and angle that is convenient for the user. The mounting device can be secured on an even or an uneven surface to enable the user to use the electronic device in, for example, a sitting or a resting position over the even surface or the uneven surface.

The mounting device disclosed herein comprises an adjustable receptacle, a first ball head, a second ball head, telescopic pole, and a tripod. The first ball head comprises a ball in rotatable communication with a casing within which the ball is disposed. The ball of the first ball head comprises a stem projecting out of an opening in the ball casing. The stem of the first ball head engages a base of the adjustable receptacle. A top end of the telescopic pole is attached to a base of the ball casing of the first ball head. The second ball head comprises a ball in rotatable communication with a casing within which the ball is disposed. The ball of the second ball head comprises a stem projecting out of an opening in the ball casing. The stem of the second ball head engages a bottom end of the telescopic pole. The tripod is attached to a base of the casing of the second ball head.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific structures and components disclosed herein. The description of a structure or a component referenced by a numeral in a drawing is applicable to the description of that structure or component shown by that same numeral in any subsequent drawing herein.

DETAILED DESCRIPTION OF THE INVENTION

Figure 1A:
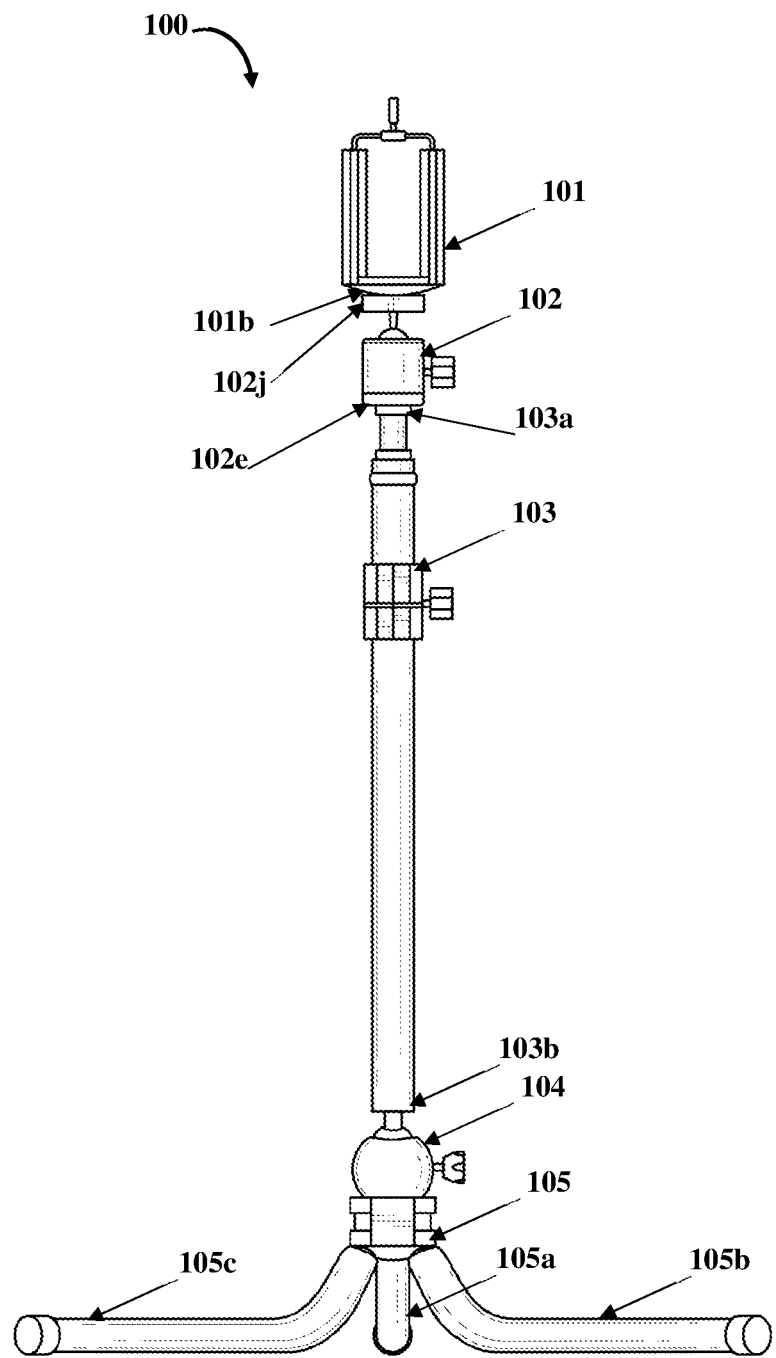
FIG. 1A illustrates a front view of the mounting device disposed on a tripod with flexible, adjustable legs.
Figure 1B:
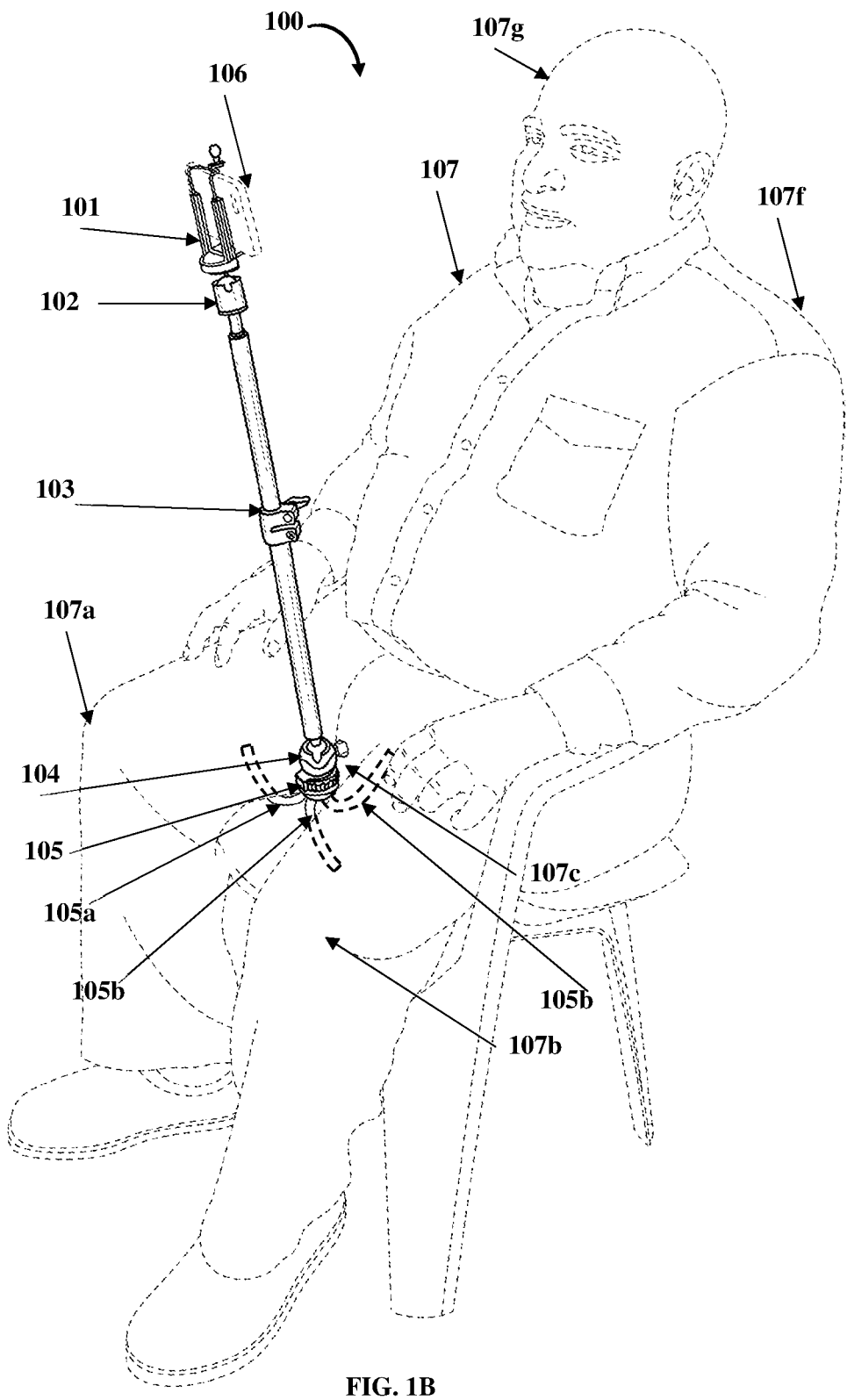
FIG. 1B illustrates a perspective view of the mounting device used by a user.
Figure 3A:
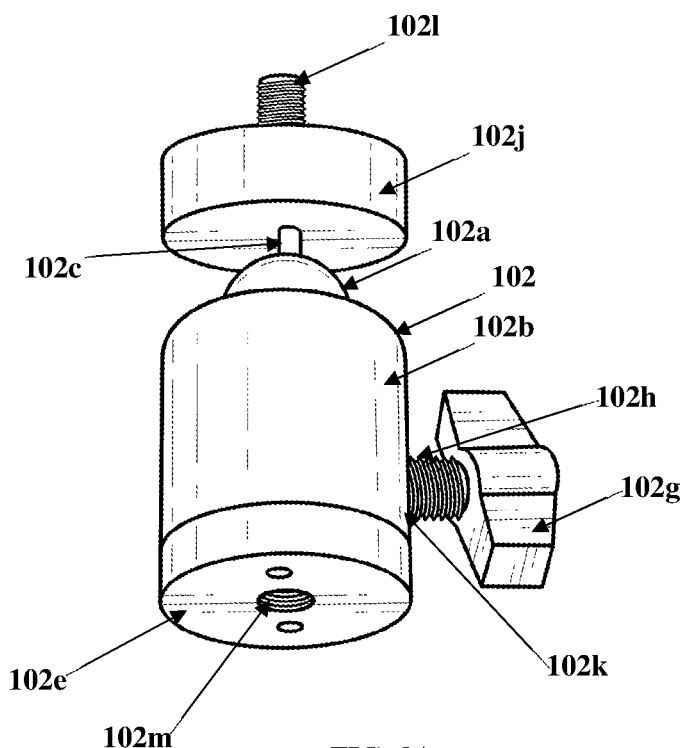
FIG. 3A illustrates a bottom perspective view of a first ball head of the mounting device.
Figure 3B:
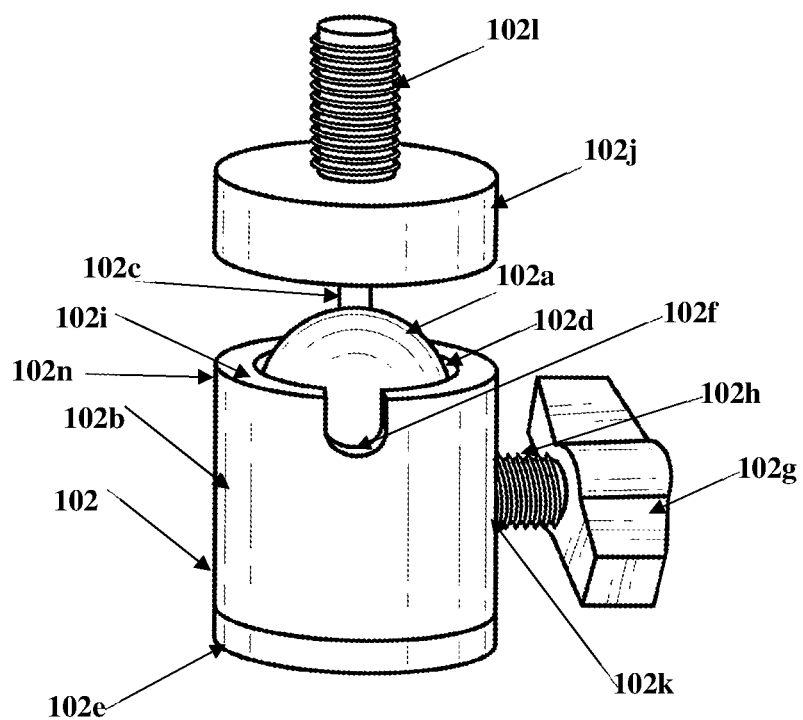
FIG. 3B illustrates a top perspective view of the first ball head of the mounting device.
Figure 3C:
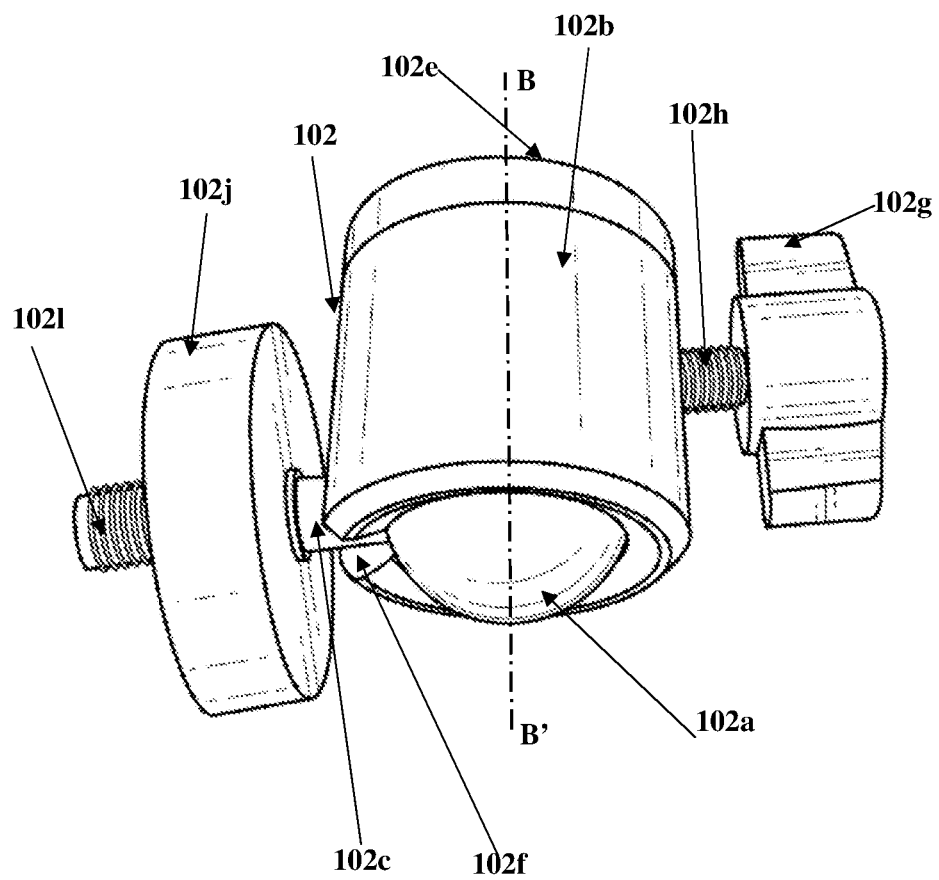
FIG. 3C illustrates another top perspective view of the first ball head of the mounting device showing the stem of the first ball head positioned in the circumferential groove by rotation of a ball of the first ball head.

FIG. 1A illustrates a front view of a mounting device 100 for an electronic device showing a tripod 105 comprising flexible, semi-rigid legs 105a, 105b and 105c that are deformable by moderate manual pressure to configure to any shape or orientation as set by a user, and to thereafter retain their configuration with respect to one another. FIG. 1B illustrates a perspective view of the mounting device 100 used by the user 107. The mounting device 100 comprises an adjustable receptacle 101 for holding an electronic device 106, and a first ball head 102 comprising a ball 102a in rotatable communication with a casing 102b within which the ball 102a is disposed, as shown in FIGS. 3A and 3B. The ball 102a of the first ball head 102 comprises a stem 102c projecting out of an opening 102d in the ball casing 102b as shown in FIG. 3B, FIG. 3C. The stem 102c engages a base 101b of the adjustable receptacle 101. The mounting device 100 further comprises a telescopic pole 103. The telescopic pole 103 comprises a top end 103a and a bottom end 103b, as shown in FIG. 1A. The top end 103a of the telescopic pole 103 engages with the base 102e of the ball casing 102b of the first ball head 102.

Figure 1C:
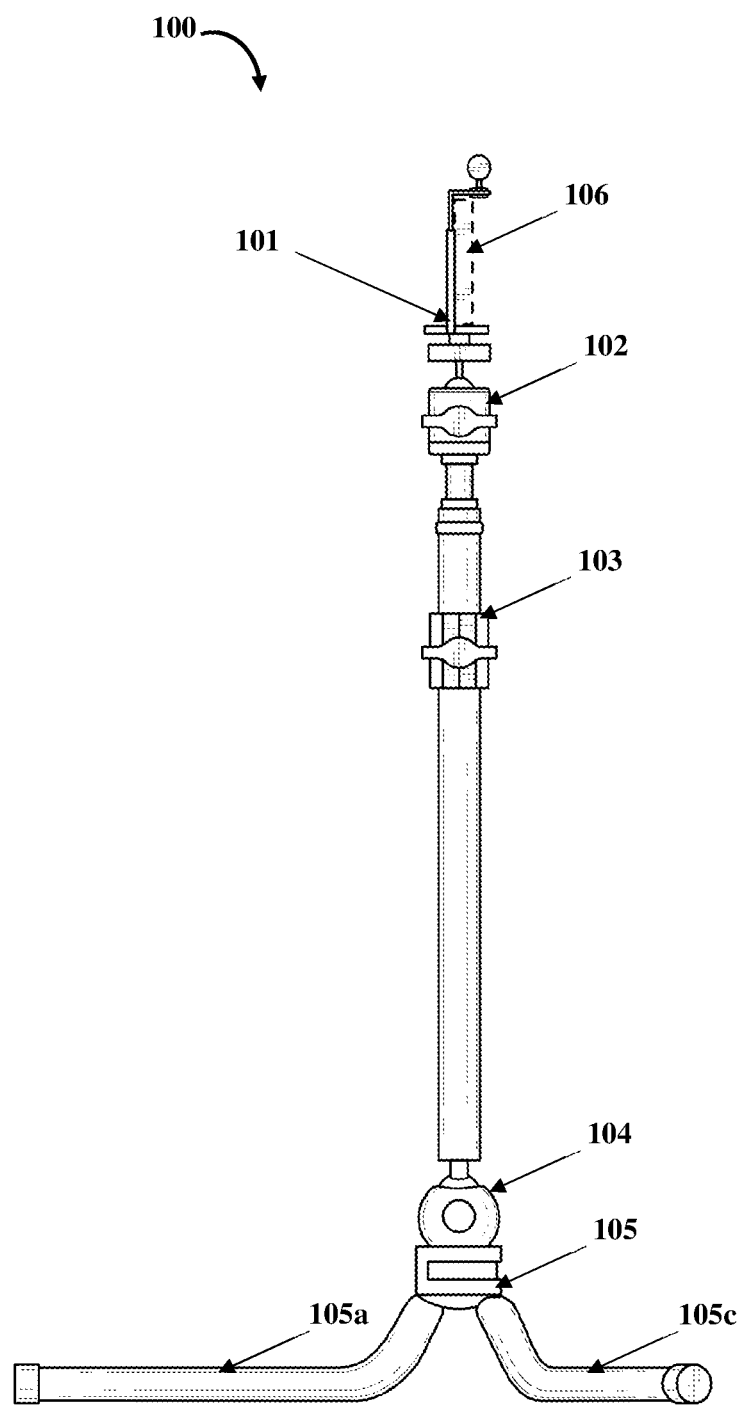
FIG. 1C illustrates a left view of the mounting device showing the flexible tripod.
Figure 5A:
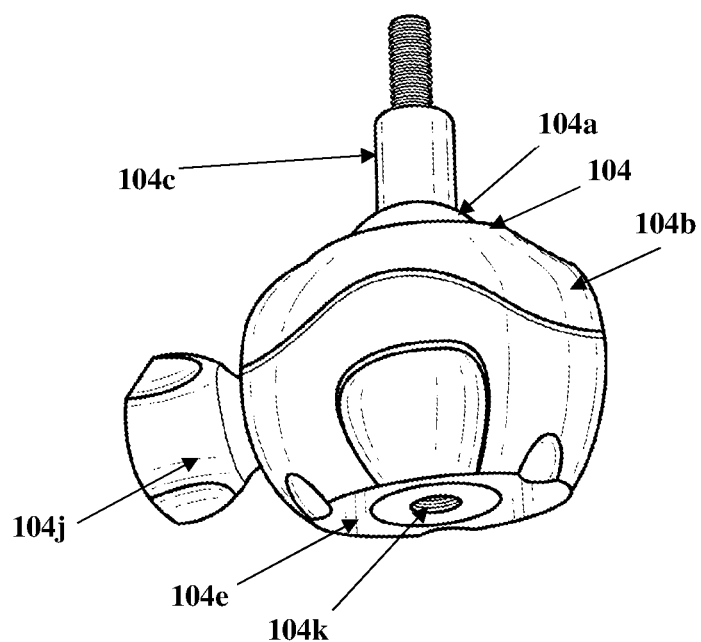
FIG. 5A illustrates a bottom perspective view of a second ball head of the mounting device.
Figure 5B:
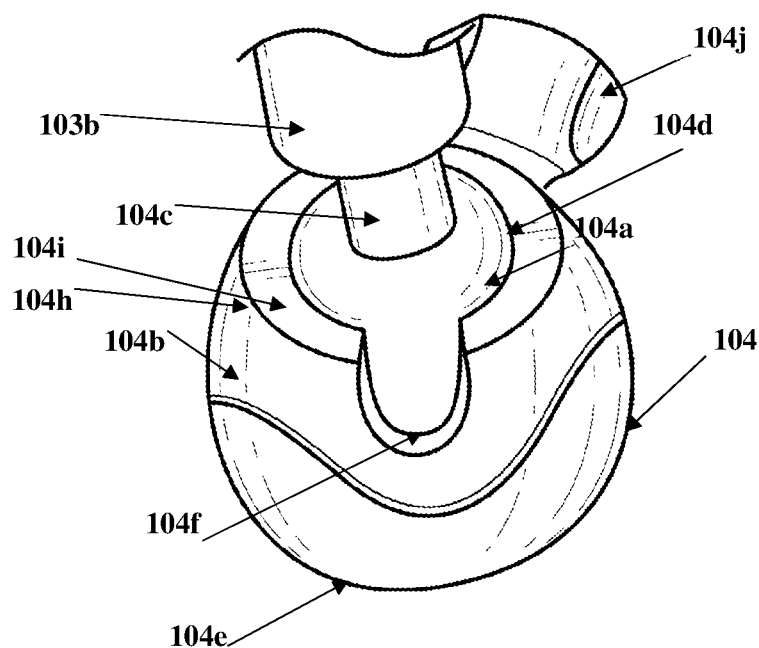
FIG. 5B illustrates a top perspective view of the second ball head of the mounting device.
Figure 5C:
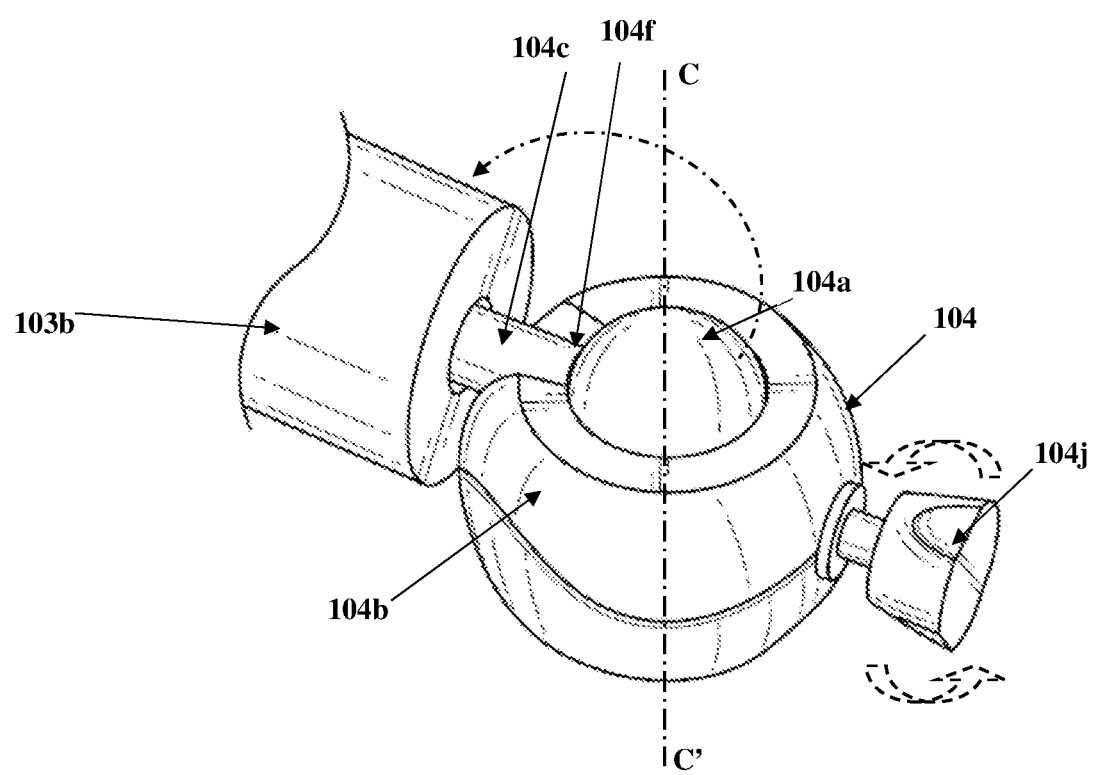
FIG. 5C illustrates another top perspective view of the second ball head of the mounting device showing a stem of the second ball head disposed in the circumferential groove by rotation of a ball of the second ball head.
Figure 5D:
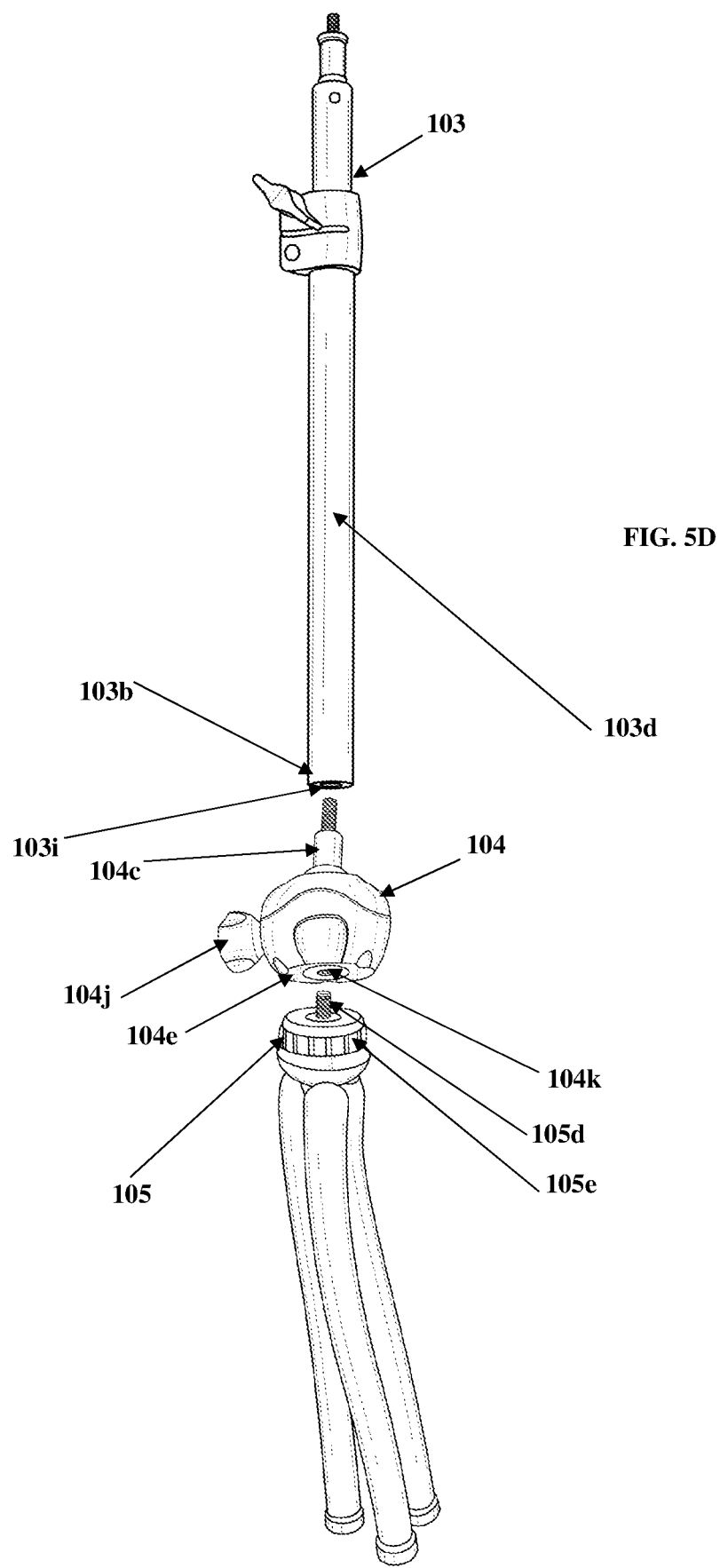
FIG. 5D illustrates an exploded view showing the telescopic pole and the tripod aligned with the second ball head.

FIG. 1C illustrates a left view of the mounting device 100 showing the flexible tripod 105. The mounting device 100 further comprises a second ball head 104, as shown in FIGS. 5A and 5B. The second ball head 104 comprises a ball 104a in rotatable communication with a ball casing 104b within which the ball 104a is disposed. The ball 104a comprises a stem 104c projecting out of an opening 104d in the ball casing 104b. The stem 104c engages with the bottom end 103b of the telescopic pole 103 as shown in FIGS. 5B, 5C and 5D.

The mounting device 100 further comprises the tripod 105 as shown in FIGS. 1A-1C and 6. The tripod 105 engages with the base 104e of the ball casing 104b of the second ball head 104 as shown in FIG. 5D.

Figure 2A:
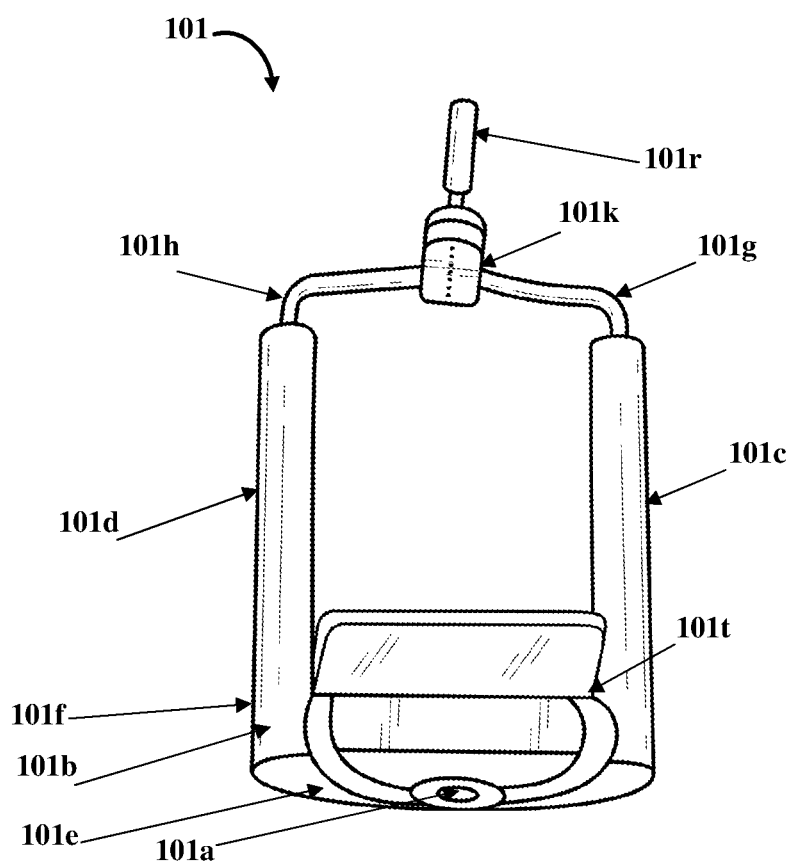
FIG. 2A illustrates a front perspective view of an adjustable receptacle of the mounting device.
Figure 2B:
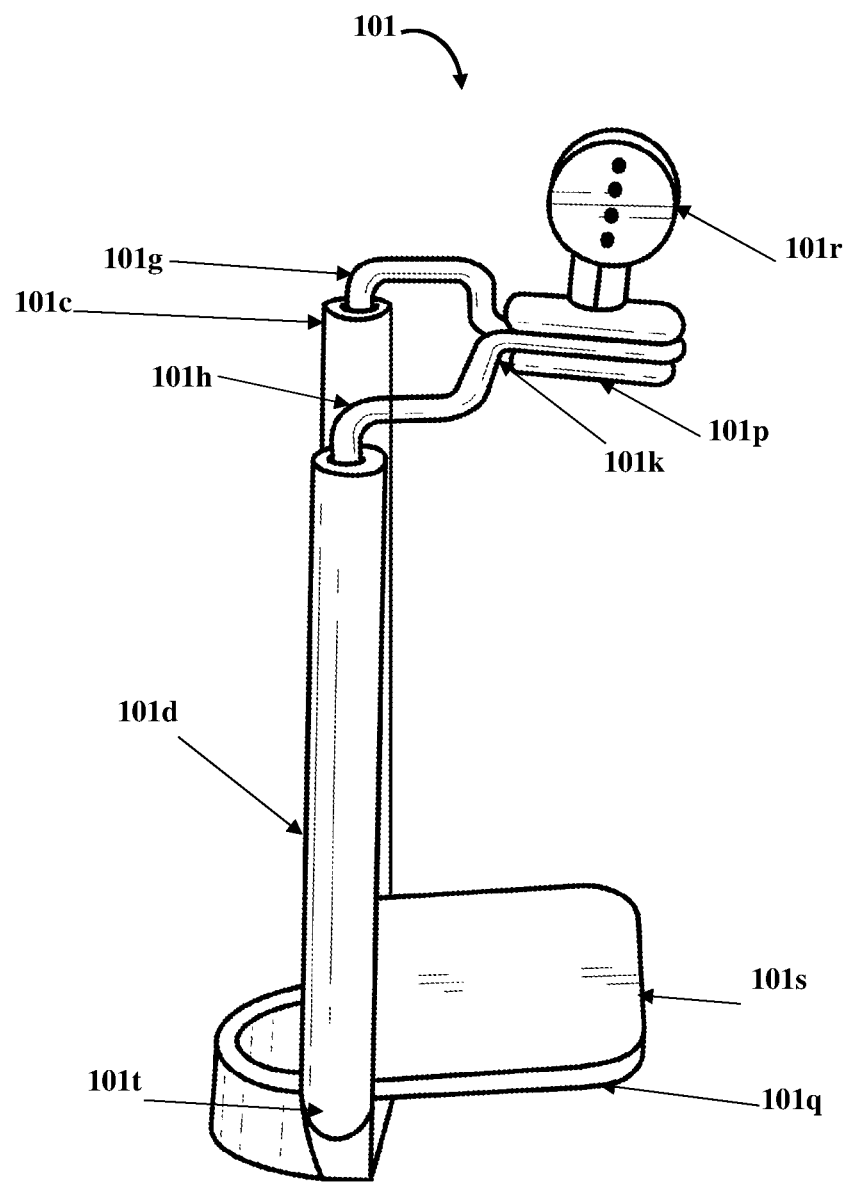
FIG. 2B illustrates a left side view of the adjustable receptacle of the mounting device.
Figure 2C:
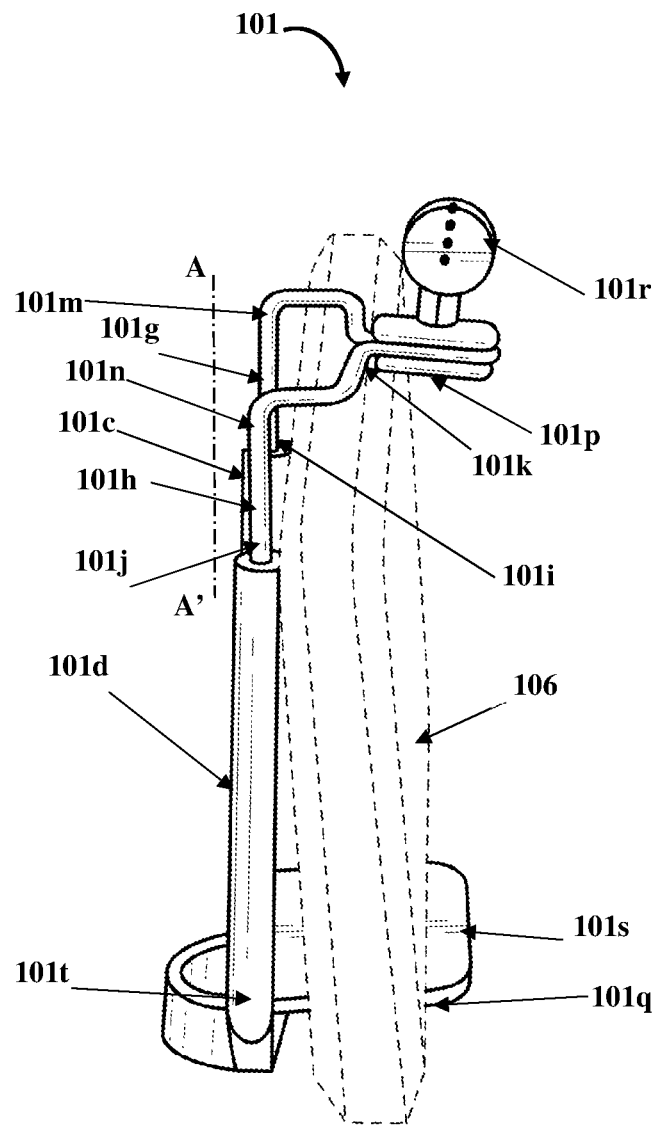
FIG. 2C illustrates a left side perspective view of the adjustable receptacle of the mounting device with an electronic device secured in the adjustable receptacle.
Figure 2D:
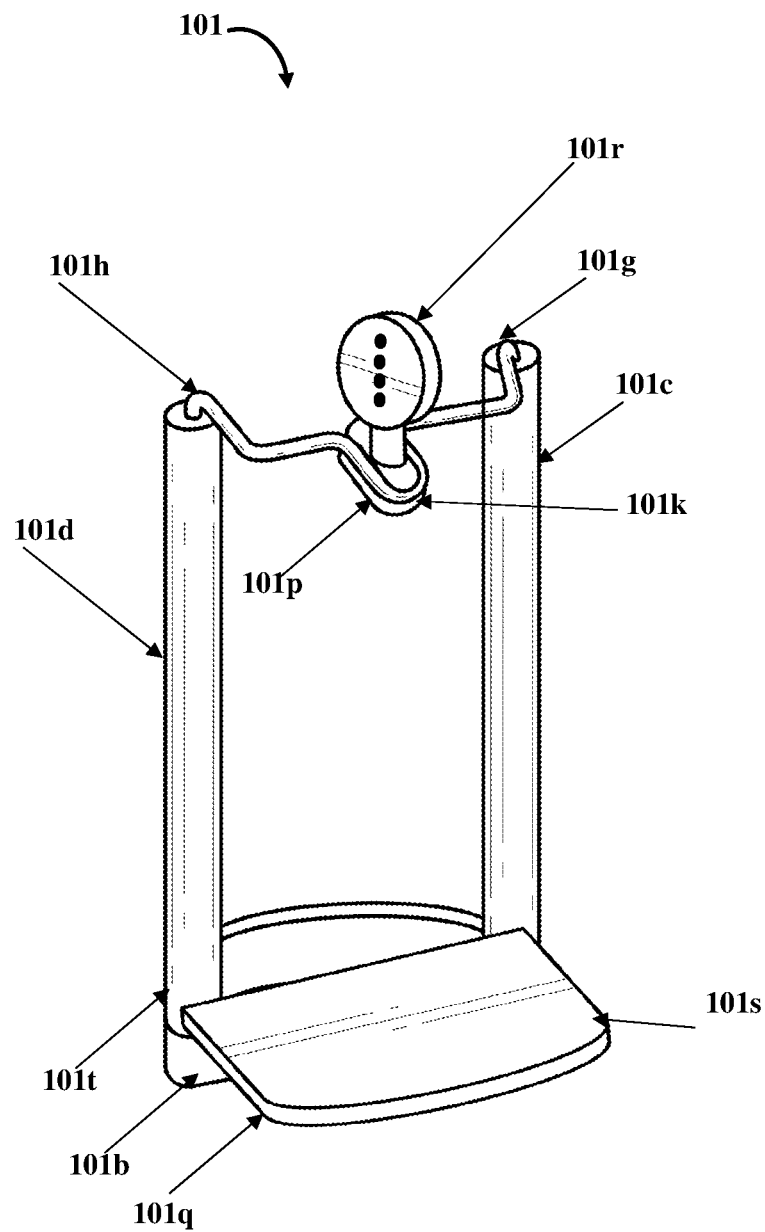
FIG. 2D illustrates another front perspective view of the adjustable receptacle of the mounting device.

FIG. 2A illustrates a front perspective view of the adjustable receptacle 101 of the mounting device 100. FIG. 2B illustrates a left side perspective view of the adjustable receptacle 101 of the mounting device 100. FIG. 2C illustrates a left side perspective view of the adjustable receptable 101 of the mounting device 100 with an electronic device 106 secured in the adjustable receptable 101. FIG. 2D illustrates another front perspective view of the adjustable receptacle 101 of the mounting device 100. As shown in FIGS. 2A and 2B, the adjustable receptable 101 comprises a screw hole 101a at a lower section 101e of the base 101b of the adjustable receptacle 101. The adjustable receptable 101 comprises a pair of spring loaded arms 101c and 101d projecting substantially perpendicularly from an upper section 101f of the base 101b. The adjustable receptable 101 further comprises a pair of sliding members 101g and 101h, as shown in FIGS. 2A and 2B. The pair of sliding members 101g and 101h comprise lower portions 101i and 101j that are configured to slidably engage with the pair of spring loaded arms 101d and 101c, along an axis A-A' illustrated in FIG. 2C. The axis A-A' runs along the length of the adjustable receptacle 101. The upper portions 101m and 101n of the pair of sliding members 101g and 101h extend substantially perpendicular to the axis A-A' along which the pair of sliding members 101g and 101h slide. The adjustable receptacle 101 further comprises a first jaw 101k attached to upper portions 101m and 101n of the pair of sliding members 101g and 101h. The adjustable receptacle 101 further comprises a first end 101p and a second end 101q, as shown in FIG. 2C. The first jaw 101k and the pair of sliding members 101g and 101h are configured to move the first end 101p of the adjustable receptacle 101 relative to the second end 101q to secure the electronic device 106 in the adjustable receptacle 101, and to move the first end 101p of the adjustable receptacle 101 to release the electronic device 106. The pair of sliding members 101g and 101h use a pair of springs (not shown) within the pair of spring loaded arms 101d and 101c to slide the first end 101p of the adjustable receptable 101 into a position such that the first end 101p with the force from the pair of springs, secures the electronic device 106 in the adjustable receptacle 101.

The adjustable receptable 101 further comprises a pull knob 101r attached to the first jaw 101k, as shown in FIGS. 2A and 2B. The first jaw 101k extends substantially perpendicular to the axis A-A and away from the upper portions 101m and 101n of the pair of sliding members 101g and 101h. The adjustable receptable 101 further comprises a second jaw 101s that extends substantially perpendicular to the axis A-A' and away from the lower portion 101t of the pair of spring loaded arms 101d and 101c. The electronic device 106 is held between the first jaw 101k and the second jaw 101s, as shown in FIG. 2B.

FIG. 3A illustrates a bottom perspective view of the first ball head 102 of the mounting device 100. FIG. 3B illustrates a top perspective view of the first ball head 102 of the mounting device 100. The first ball head 102 comprises a ball 102a in rotatable communication with the ball casing 102b within which the ball 102a is disposed. The ball 102a has one of a spherical shape, an aspherical shape, etc. The first ball head 102 further comprises a circumferential groove 102f on an upper section 102n of a wall 102i of the ball casing 102b, as shown in FIG. 3B. The ball 102a rotates within the ball casing 102b to engage the stem 102c in the circumferential groove 102f. The ball casing 102b further comprises a friction knob 102g. The friction knob 102g comprises a threaded rod 102h that projects into the ball casing 102b through a threaded hole 102k in the wall 102i of the ball casing 102b. When the friction knob 102g is rotated in a clockwise direction, the friction knob 102g advances into the ball casing 102b to progressively constrict the rotatable movement of the ball 102a within the ball casing 102b. When the friction knob 102g is rotated in an anticlockwise direction, the friction knob 102g retracts from the ball casing 102b to progressively loosen the rotatable movement of the ball 102a within the ball casing 102b. FIG. 3C illustrates another top perspective view of the first ball head 102 of the mounting device 100 showing the stem 102c of the first ball head 102 engaged in the circumferential groove 102f by rotation of the ball 102a of the first ball head 102. As illustrated in FIG. 3C, the stem 102c is disposed substantially perpendicular to an axis B-B' that runs along the length of the ball casing 102b. The angle of inclination between the axis B-B' and the stem 102c is about 90 degrees when the stem 102c of the first ball head 102 is disposed within the circumferential groove 102f. In an embodiment, the angle of inclination between the axis B-B' and the stem 102c can be varied between 0 degrees to 90 degrees by positioning the stem 102c at any position between the circumferential groove 102f and along the axis B-B'.

The first ball head 102 further comprises a support plate 102j rigidly attached to a mid-section of the stem 102c. An upper section 102l of the stem 102c is threaded to mate with the screw hole 101a in the base 101b of the adjustable receptable 101. The support plate 102j is configured to frictionally engage with the base 101b. As the upper section 102l of the stem 102c is threaded into the screw hole 101a in the base 101b, the support plate 102j and the stem 102c tighten with the base 101b of the adjustable receptable 101.

Figures 4A, 4B:
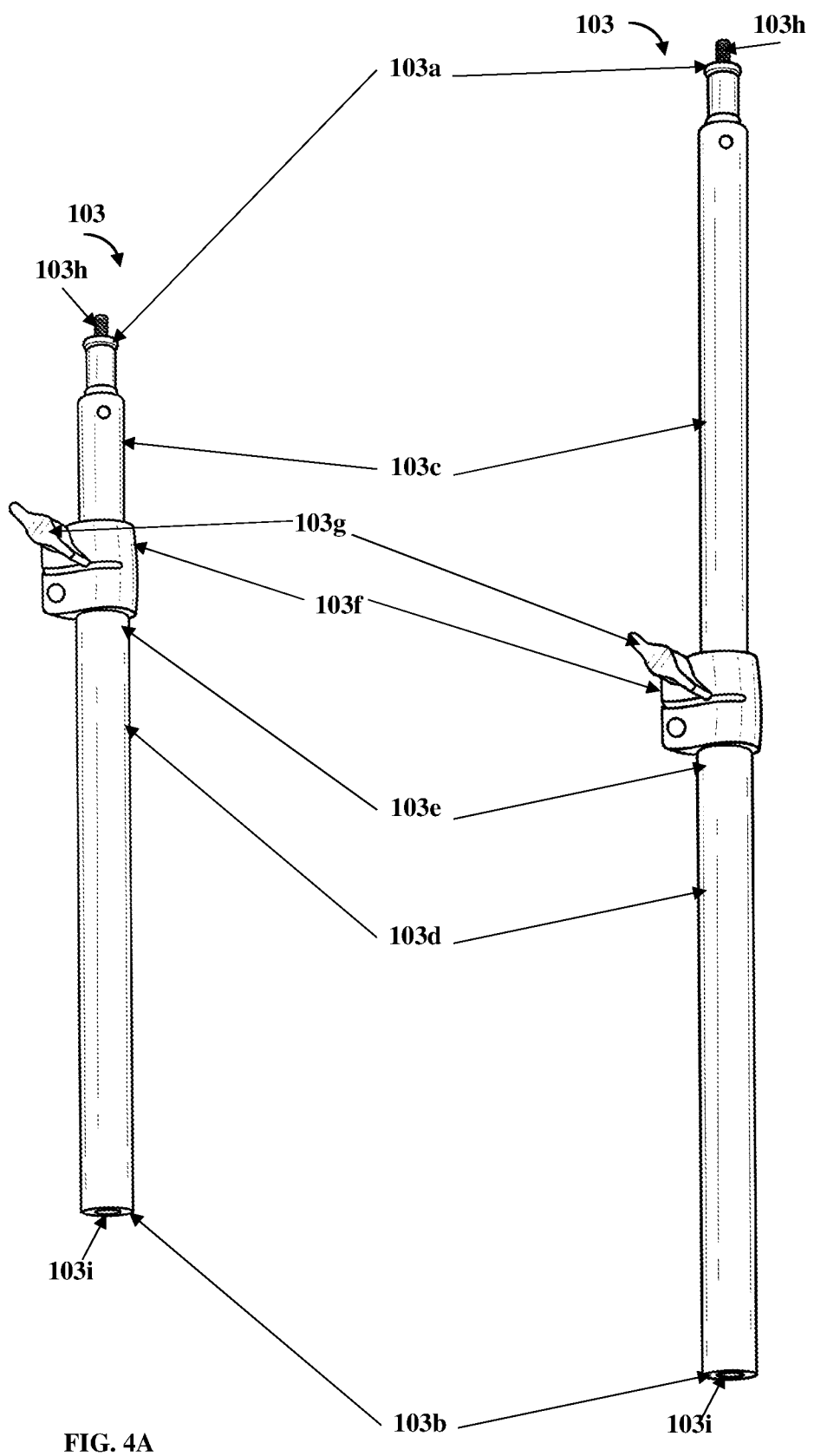
FIG. 4A illustrates a telescopic pole of the mounting device stand in a non-extended position.
FIG. 4B illustrates the telescopic pole of the mounting device in an extended position.

FIG. 4A illustrates a telescopic pole 103 of the mounting device 100 in a non-extended position. FIG. 4B illustrates the telescopic pole 103 of the mounting device 100 in an extended position. The telescopic pole 103 comprises a first pole 103c and a second pole 103d. The first pole 103c is configured to slidably engage with the second pole 103d, through an upper end 103e of the second pole 103d. The telescopic pole 103 further comprises a clamp 103f attached to the upper end 103e of the second pole 103d. The clamp 103f comprises a knob 103g. The clamp 103f is configured to secure the first pole 103c with the second pole 103d. For example, the knob 103g is rotated anticlockwise to reduce the grip of the upper end 103e of the second pole 103d on the first pole 103c, allowing the first pole 103c to slide in and out of the upper end 103e of the second pole 103d. The knob 103g is rotated clockwise to tighten the grip of the upper end 103e of the second pole 103d on the first pole 103c, thereby securing the first pole 103c to the upper end 103e of the second pole 103d. In an embodiment, the first pole 103c comprises a threaded rod 103h projecting from a top end 103a of the telescopic pole 103, for example, from a top end 103a of the first pole 103c. The threaded rod 103h is configured to mate and fasten with a threaded hole 102m in the base 102e of the ball casing 102b of the first ball head 102. In an embodiment, the second pole 103d comprises a threaded hole 103i at the bottom end 103b of the second pole 103d. In an embodiment, the telescopic pole 103 comprises one or more intervening telescopic poles (not shown) between the second pole 103d and the first pole 103c.

FIG. 5A illustrates a bottom perspective view of the second ball head 104 of the mounting device 100. FIG. 5B illustrates a top perspective view of the second ball head 104 of the mounting device 100. The second ball head 104 comprises a ball 104a in rotatable communication with the ball casing 104b within which the ball 104a is disposed. The second ball head 104 further comprises a circumferential groove 104f on an upper section 104h of a wall 104i of the ball casing 104b. The ball 104a is configured to rotate within the ball casing 104b with the stem 104c disposed within the circumferential groove 104f. The ball casing 104b further comprises a friction knob 104j configured to one of progressively tighten and progressively loosen the rotatable movement of the ball 104a, similar to the way the friction knob 102g of the first screw head 102 to one of progressively constricts and progressively loosens the rotatable movement of the ball 102a. The friction knob 104g is rotated in a clockwise direction to progressively tighten the rotatable movement of the ball 104a. The friction knob 104g is rotated in an anti-clockwise direction to progressively loosen the rotatable movement of the ball 104a, as illustrated in FIG. 5C. FIG. 5C illustrates another top perspective view of the second ball head 104 of the mounting device 100 showing the stem 104c of the second ball head 104 positioned in the circumferential groove 104f by rotation of the ball 104a of the second ball head 104. As illustrated in FIG. 5C, the stem 104c is positioned substantially perpendicular to an axis C-C' that runs along the length of the ball casing 104b. The angle of inclination between the axis C-C' and the stem 104c is about 90 degrees when the stem 104c of the second ball head 104 is positioned within the circumferential groove 104f. In an embodiment, the angle of inclination between the axis C-C' and the stem 104c can be varied between 0 degrees to 90 degrees by positioning the stem 104c anywhere between the circumferential groove 104f and along the axis C-C'. FIG. 5D illustrates an exploded view showing the telescopic pole and the tripod aligned with the second ball head. As shown in FIG. 5D, the base 104e of the second ball head 104 further comprises a screw hole 104k configured to receive a screw 105d projecting from an upper portion 105e of the tripod 105.

Figure 6:
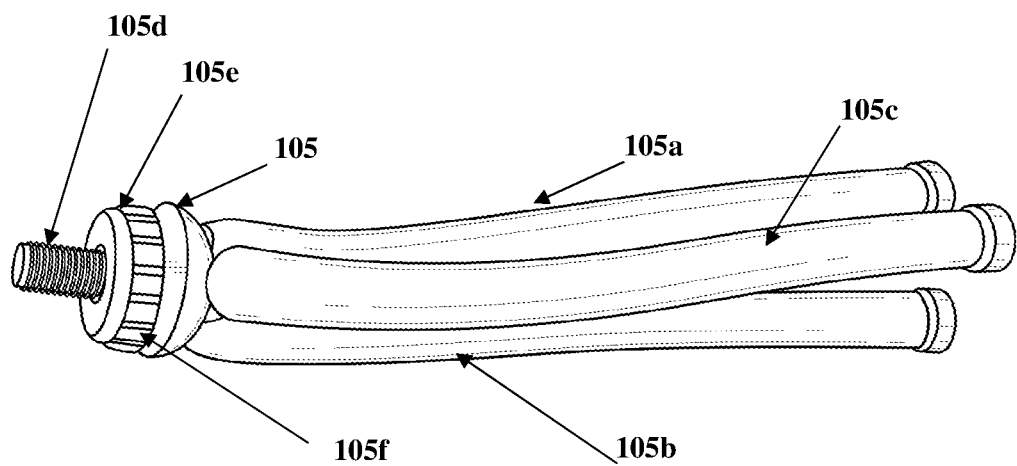
FIG. 6 illustrates the tripod of the mounting device with the legs of the tripod in a non-extended position.

FIG. 6 illustrates the tripod 105 of the mounting device 100 with the legs 105a-105c of the tripod 105 in proximity to one another. As illustrated in FIGS. 1A-1C, the legs 105a-105c of the tripod 105 are flexible, semi-rigid and configurable to the orientation desired by the user 107, by application of manual pressure by the user 107. Each individual leg 105a is configurable with respect to the other legs 105b and 105c. The legs 105a-105c are angled away from each other to form the tripod 105. The tripod 105 comprises a hub 105f on an upper portion 105e to which each of the legs 105a-105c are connected. The tripod 105 comprises a screw 105d projecting, for example, perpendicularly, from the hub 105f on the upper portion 105e of the tripod 105.

Figure 7A:
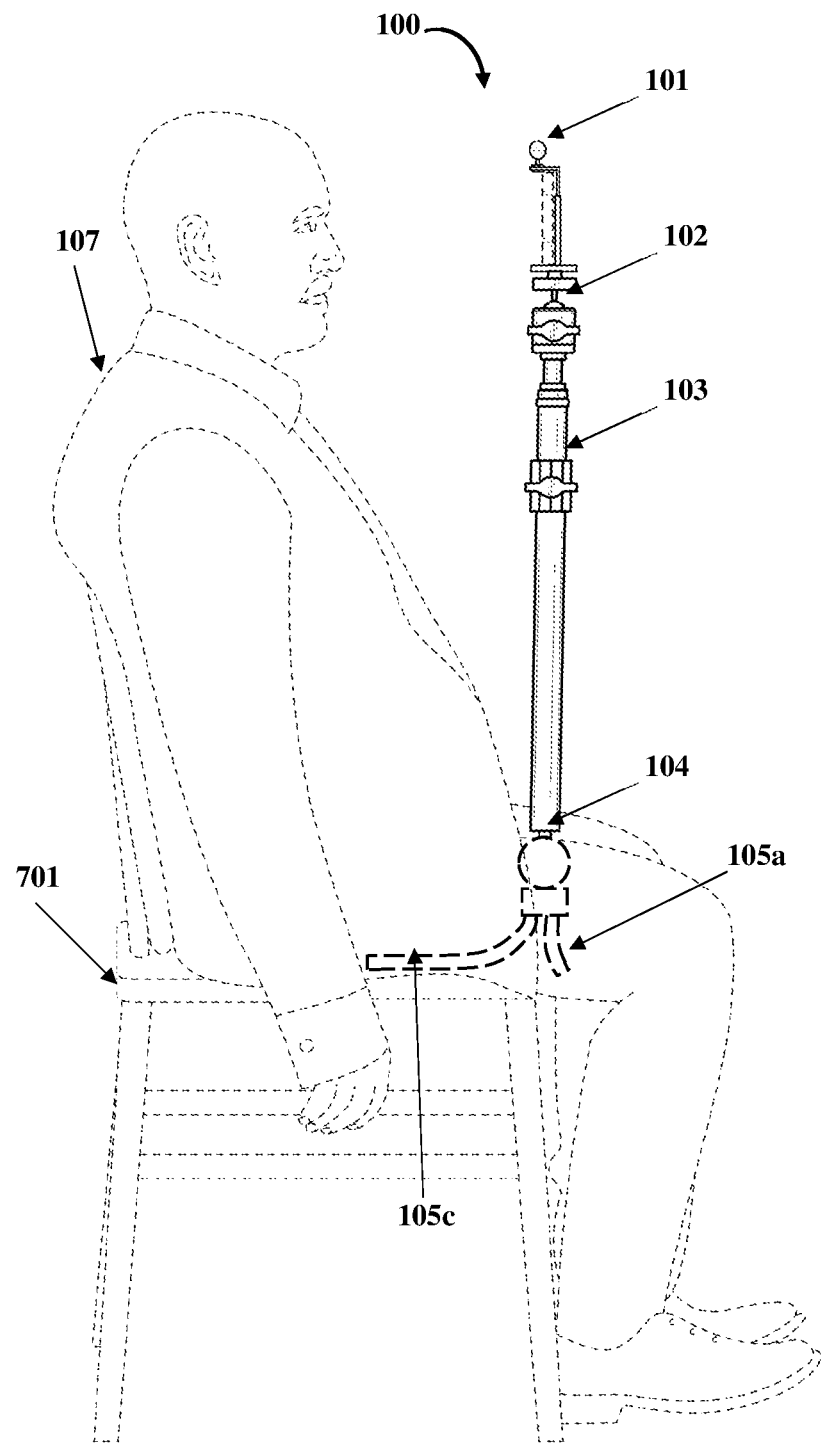
FIG. 7A illustrates a right-side view showing the mounting device used by the user while sitting on a chair.
Figure 7B:
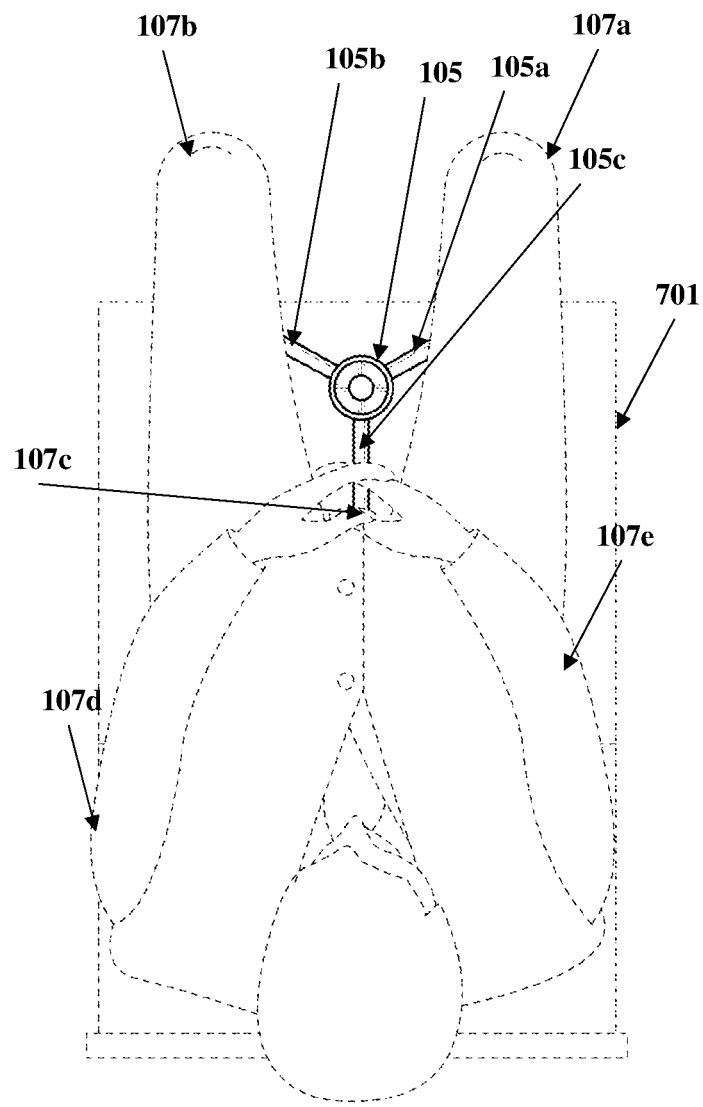
FIG. 7B illustrates a top view showing the flexible legs of the tripod of the mounting device positioned with respect to the user.

FIG. 7A illustrates a right side view of the mounting device 100 used by the user 107 while sitting on a chair 701. FIG. 7B illustrates a top view showing the position of the flexible legs 105a-105c of the tripod 105 of the mounting device 100 as set by the user 107. As shown in FIGS. 7B and 1B, when the user 107 uses the mounting device 100 in a seated position, the user 107 bends the flexible, semi-rigid legs 105a-105c to form a tripod 105. In an embodiment, the user 107 places two of the flexible legs, for example, 105a and 105b under the thighs of the user, for example a right thigh 107a and a left thigh 107b. The third flexible leg 105c is placed under his crotch region 107c. This configuration and placement of the mounting device 100 provides a stable support for the mounting device 100. The user 107 can adjust the height, horizontal tilt and vertical tilt of the electronic device 106 with respect to the tripod 105. Furthermore, after the user 107 positions the mounting device 100 on the tripod 105, both of the user's 107 hands 107d and 107e are free. In an embodiment, the tripod 105 is, for example, "Large flexible octopus tripod stand desktop camera tripod mobile phone support" manufactured by Shaoxing Shangyu Forfeel Photographic Equipment Co., Ltd., Zhejiang Province, China. In another embodiment, the tripod 105 is, for example, "Camera flexible tripod 12 inch tripod lightweight bendable tripod with smartphone stand" manufactured by Shenzhen Siroka Electronic Co., Ltd., Guangdong, China.

Figure 8A:
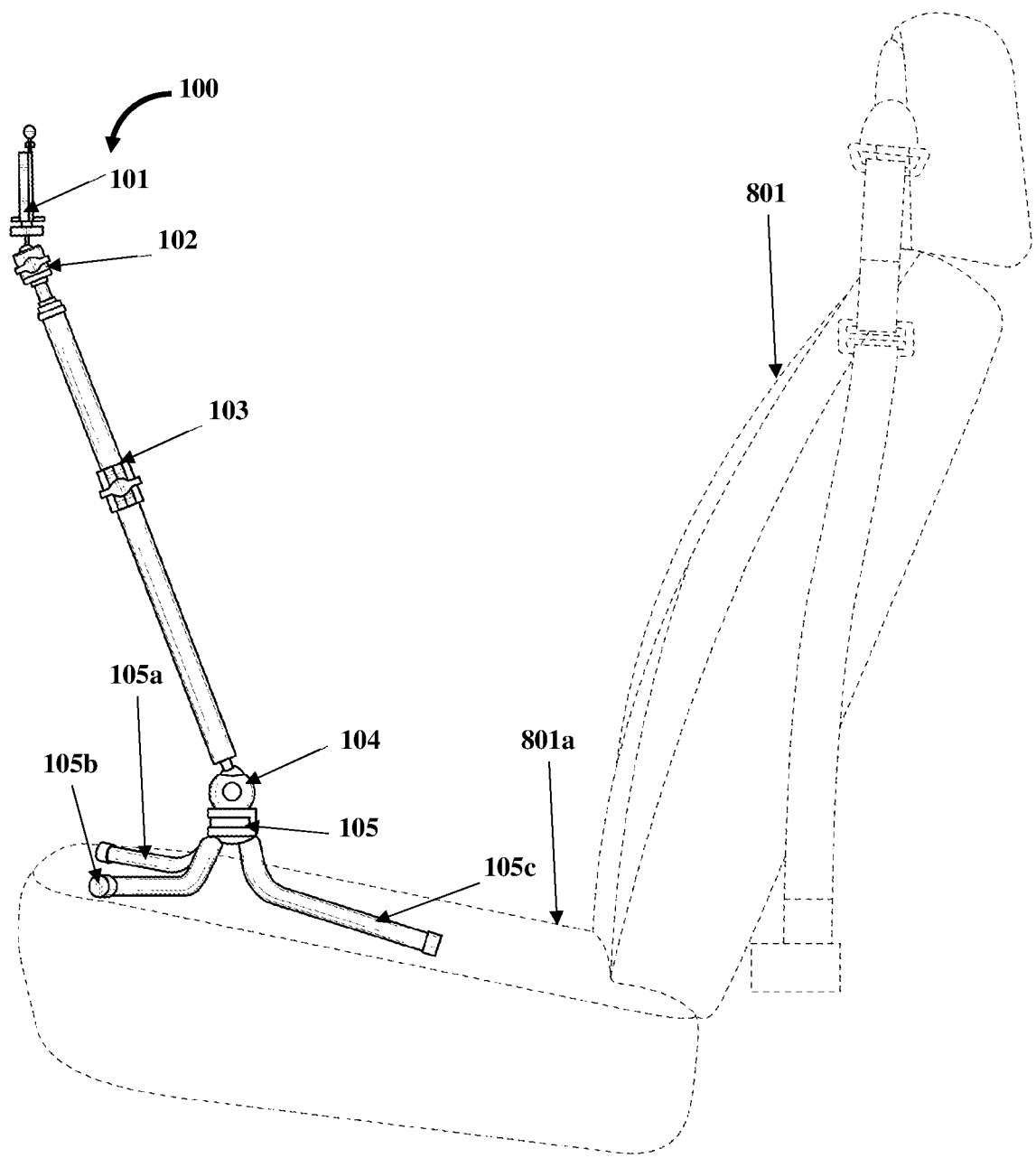
FIG. 8A illustrates the mounting device placed on an uneven base of a car seat with the flexible legs adjusted.
Figure 8B:
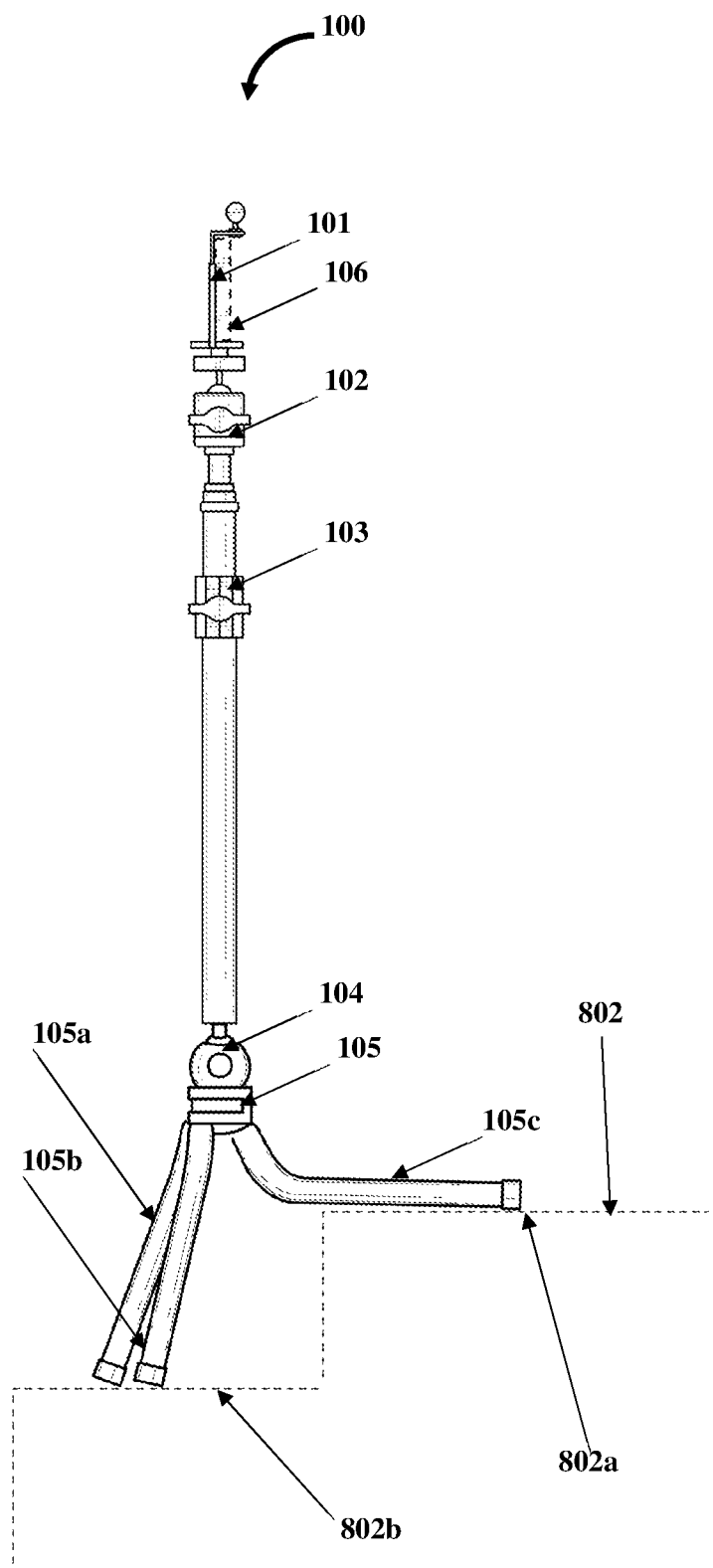
FIG. 8B illustrates the mounting device placed between two steps of a staircase with the flexible legs adjusted.

FIG. 8A illustrates the mounting device 100 placed on an uneven base 801a of a car seat 801 by adjusting the flexible, semi-rigid legs 105a-105c of the tripod 105. As shown in FIG. 8A, the telescopic pole 103 attached to the stem 104c of the second ball head 104 is inclined away from the seat back 801b by using the friction knob 104g. The adjustable receptacle 101 comprising electronic device 106 is inclined to face the seat back 801b by using the friction knob 102g. FIG. 8B illustrates the mounting device 100 placed between two steps 802a and 802b of a staircase 802 by adjusting the flexible legs 105a, 105b and 105c.

Figure 9A:
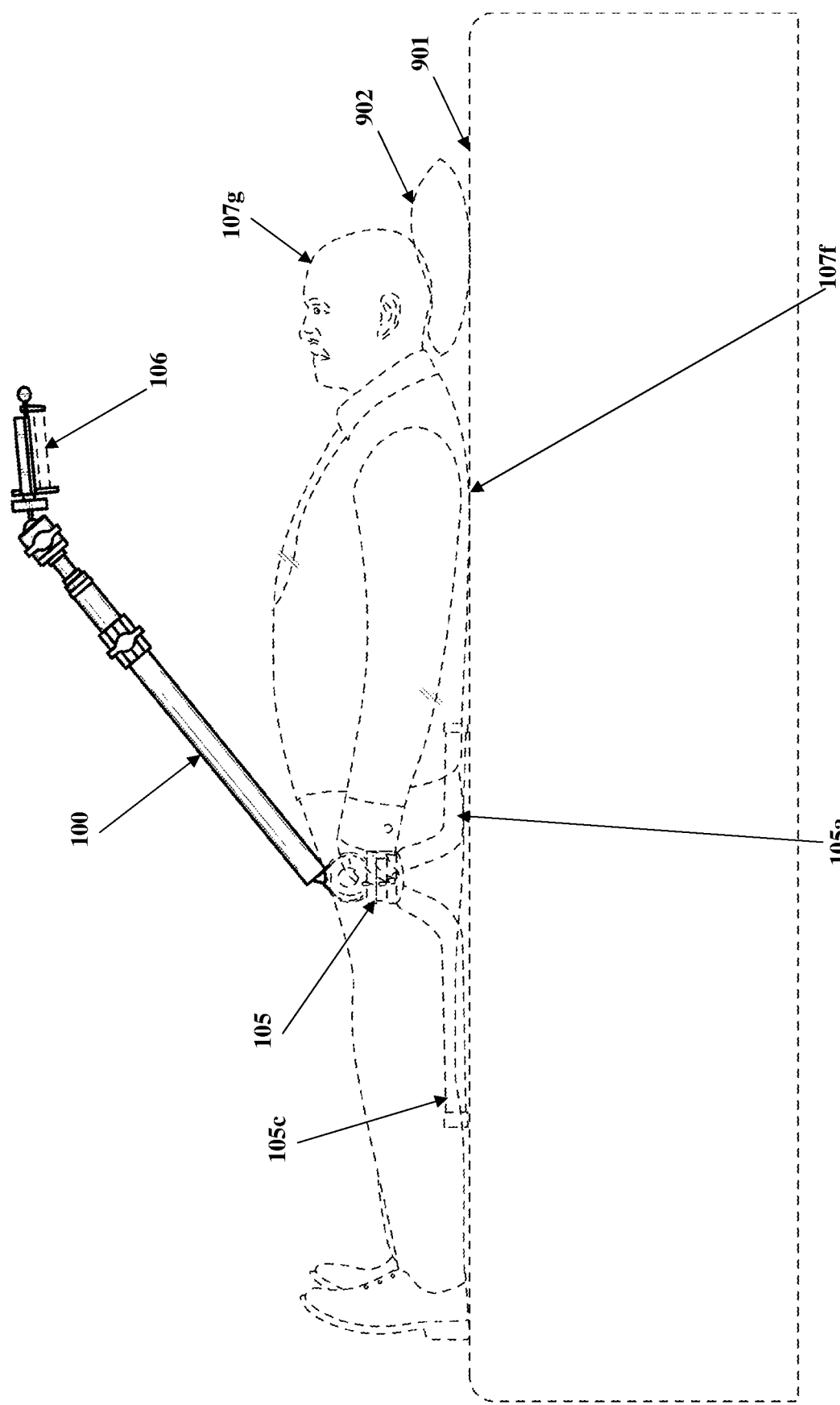
FIG. 9A illustrates a right-side view showing the mounting device positioned between the user's thighs when the user is lying down on his back on a bed.
Figure 9B:
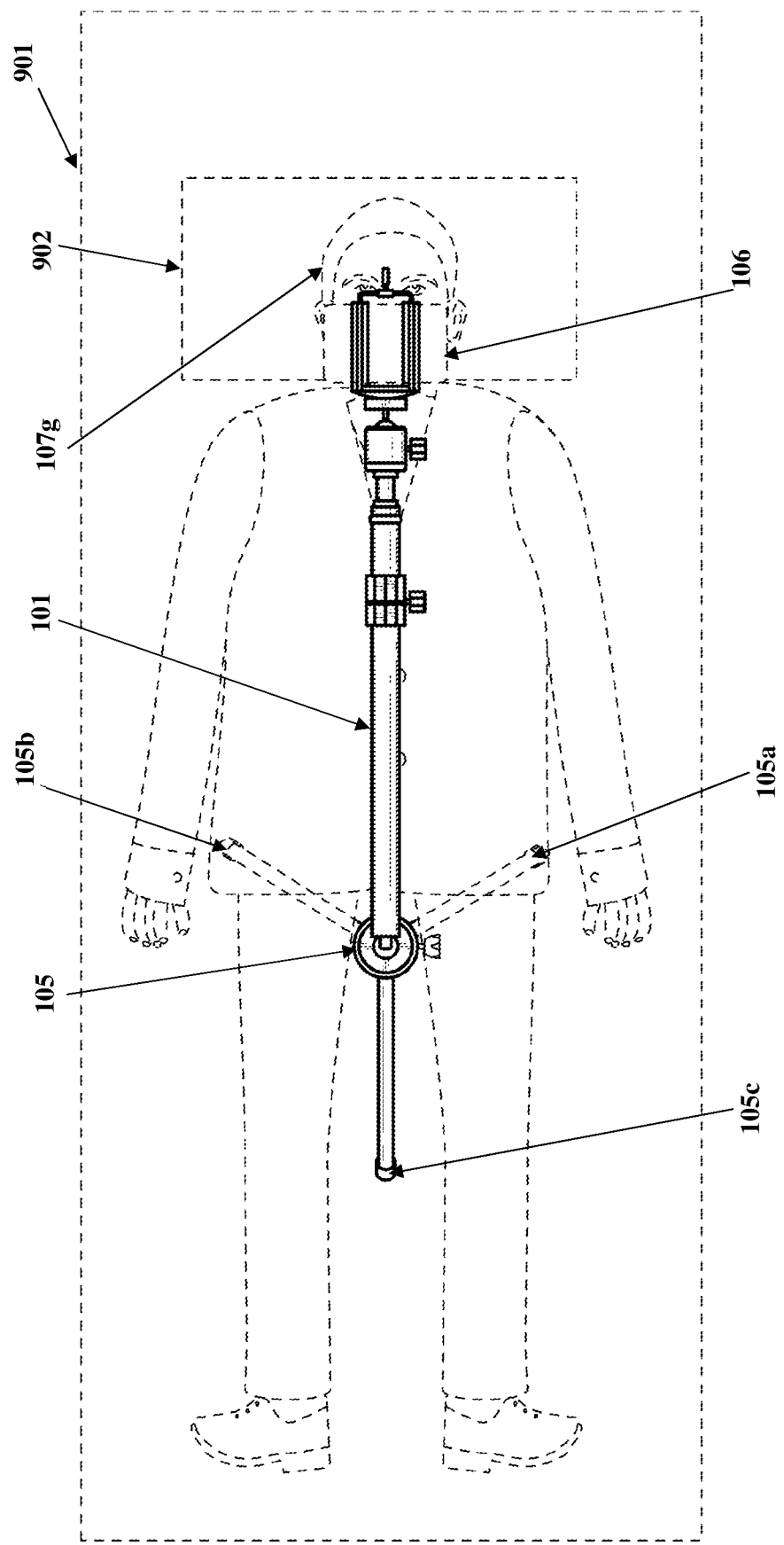
FIG. 9B illustrates a top view showing the mounting device positioned between the user's thighs when the user is lying down on his back on the bed illustrated in FIG. 9A.

FIG. 9A illustrates a right-side view showing the mounting device 100 positioned between the user's 107 thighs 107a and 107b when the user 107 is lying down or resting on his back 107f on a bed 901. FIG. 9B illustrates a top view showing the mounting device 100 positioned between the user's 107 thighs 107a and 107b when the user 107 is lying down or resting on his back 107f on the bed 901 illustrated in FIG. 9A. As illustrated in FIGS. 9A and 9B, the flexible, semi-rigid legs 105a-105c are bent away from each other. Furthermore, the flexible, semi-rigid legs 105a-105c are bent such that each of the legs 105a-105c are parallel to the surface of the bed 901. When the legs 105a-105c are parallel to the surface of the bed 901, it is convenient for the user 107 to position the legs, for example, legs 105a and 105b underneath his thighs 107a and 107b as illustrated in FIGS. 9A and 9B.

Figure 10A:
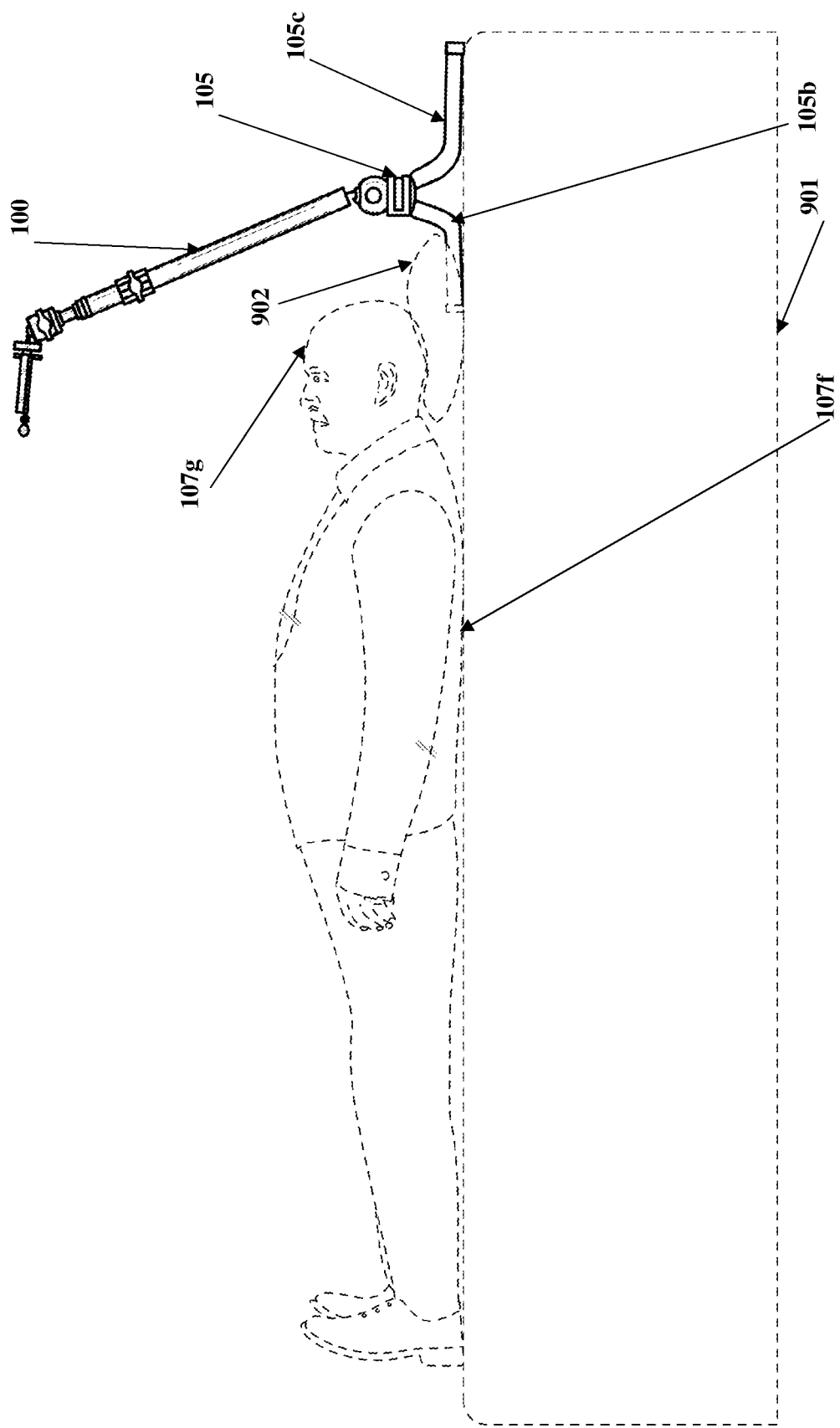
FIG. 10A illustrates a right-side view showing the mounting device positioned above the user's head when the user is lying down on his back on the bed illustrated in FIG. 9A.
Figure 10B:
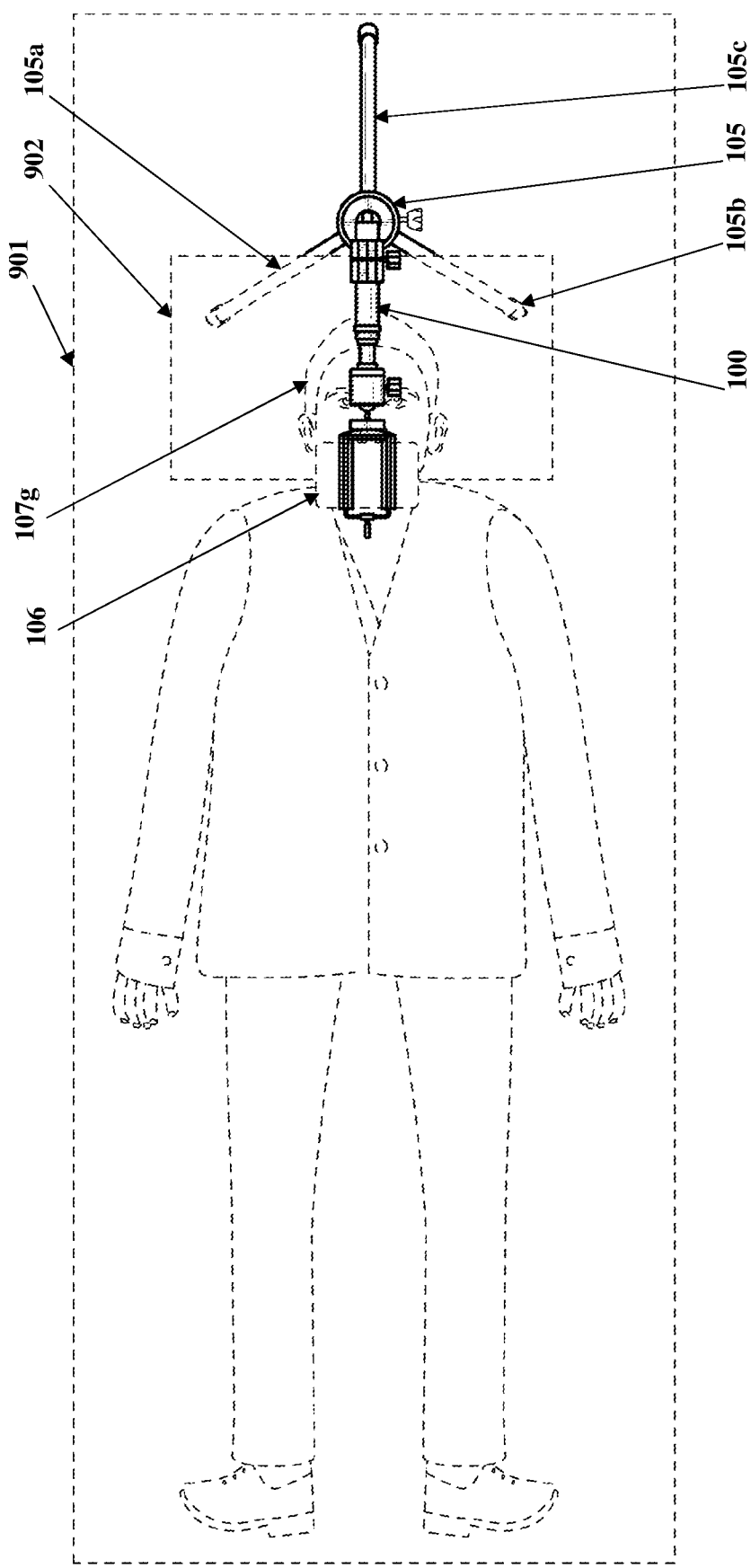
FIG. 10B illustrates a top view showing the mounting device positioned above the user's head when the user is lying down on his back on the bed illustrated in FIG. 9A.

FIG. 10A illustrates a right-side view showing the mounting device 100 positioned above the user's 107 head 107g when the user 107 is lying down or resting on his back 107f on the bed 901 illustrated in FIG. 9A. FIG. 10B illustrates a top view showing the mounting device 100 positioned above the user's 107 head 107g when the user 107 is lying down or resting on his back 107f on the bed 901 illustrated in FIG. 9A. As illustrated in FIGS. 10A and 10B, the flexible, semi-rigid legs 105a-105c are bent away from each other. Furthermore, the flexible, semi-rigid legs 105a-105c are bent such that each of the legs 105a-105c are parallel to the surface of the bed 901. In an embodiment, the legs 105a and 105b are slid underneath a pillow 902 used by the user 107. To maximize comfort, the user 107 can place his head 107g on the portion of the pillow 902 that is between the legs 105a and 105b, as illustrated in FIGS. 10A and 10B. The first ball head 102 is used to adjust the tilt of the adjustable holder 101, comprising the electronic device 106, with respect to the first ball head 102. The second ball head 104 is used to adjust the tilt of the telescopic pole 103 with respect to the tripod 105. The telescopic pole 103 is used to position the adjustable holder 101 proximal to the second ball head 104 or away from the second ball head 104.

The foregoing examples have been provided merely for explanation and are in no way to be construed as limiting of the electronic device stand 100 disclosed herein. While the mounting device 100 has been described with reference to various embodiments, it is understood that the words, which have been used herein, are words of description and illustration, rather than words of limitation. Furthermore, although the mounting device 100 has been described herein with reference to particular means, materials, and embodiments, the mounting device 100 is not intended to be limited to the particulars disclosed herein; rather, the mounting device 100 extends to all functionally equivalent structures, methods and uses, such as are within the scope of the appended claims. While multiple embodiments are disclosed, it will be understood by those skilled in the art, having the benefit of the teachings of this specification, that the mounting device 100 disclosed herein is capable of modifications and other embodiments may be effected and changes may be made thereto, without departing from the scope and spirit of the mounting device 100 disclosed herein.

I claim:

1. A method for securing a portable electronic device to a support surface using a body weight of a user, the method comprising the steps of:
    a. providing an adjustable receptacle configured to hold the portable electronic device;
    b. attaching the adjustable receptacle to a top end of a first ball joint;
    c. attaching a bottom end of the first ball joint to a top end of a telescoping pole;
    d. attaching the portable electronic device to the adjustable receptacle;
    e. providing a tripod having a first, a second and a third flexible legs;
    f. attaching the top end of the tripod to a bottom end of a second ball joint;
    g. attaching a bottom end of the telescoping pole to a top end of the second ball joint;
    h. configuring the flexible legs to conform to the support surface;
    i. positioning the user on the support surface with the user's legs on top of the first and second flexible legs and the user's pelvis on top of the third flexible leg, wherein weight of the user presses the first, second and third flexible legs to the support surface; and
    j. adjusting the first ball joint, the second ball joint and the telescoping pole so that the portable electronic device is disposed immediately in front of a face of the user with the portable electronic device facing the user.

2. The method of claim 1, wherein the adjustable receptacle comprises a pair of spring-loaded arms projecting perpendicularly from an upper section of a base of the adjustable receptacle, wherein the adjustable receptacle further comprises a pair of sliding members, wherein lower portions of the pair of sliding members are configured to slide in and out of the pair of spring-loaded arms, wherein the adjustable receptacle further comprises a first jaw in communication with an upper portion of the pair of sliding members, wherein the first jaw and the pair of sliding members are configured to move a first end of the adjustable receptacle to secure the portable electronic device and to release the portable electronic device, and wherein the pair of sliding members use a pair of springs within the pair of spring-loaded arms to slide the first end of the adjustable receptacle into a position such that the first end of the adjustable receptacle, with force from the pair of springs, secures the portable electronic device in the adjustable receptacle.

3. The method of claim 2, wherein the adjustable receptacle further comprises a pull knob attached on an upper surface of the first jaw, wherein the first jaw extends perpendicular to an axis that runs along a length of the adjustable receptacle and away from the upper portion of the pair of sliding members, and wherein the adjustable receptacle further comprises a second jaw extending perpendicular to the axis that runs along the length of the adjustable receptacle and away from a lower portion of the pair of spring-loaded arms, and wherein the portable electronic device is secured between the first and second jaws.

4. The method of claim 1, wherein the first ball joint comprises a ball in rotatable communication with a ball casing within which the ball is disposed, the ball comprising a stem projecting out of an opening in the ball casing, wherein the stem engages a screw hole at a base of the adjustable receptacle.

5. The method of claim 4, wherein the ball casing of the first ball joint comprises an internal surface configured to engage an external surface of the ball of the first ball joint, wherein the first ball joint further comprises a circumferential groove on an upper section of a wall of the ball casing, wherein the ball of the first ball joint is configured to rotate within the ball casing and engage the stem in the circumferential groove, and wherein the ball casing further comprises a friction knob configured to one of progressively tighten and progressively loosen the rotatable movement the ball of the first ball joint.

6. The method of claim 4, wherein the first ball joint further comprises a support plate rigidly attached to a mid-section of the stem, wherein an upper section of the stem is threaded to mate with the screw hole in the base of the adjustable receptacle, and wherein the support plate is configured to frictionally engage with the base of the adjustable receptacle to tighten the support plate and the stem with the base of the adjustable receptacle.

7. The method of claim 1, wherein the second ball joint comprises a ball in rotatable communication with a ball casing within which the ball is disposed, wherein the ball the of the second ball joint comprises a stem projecting out of an opening in the ball casing, and wherein the stem engages the bottom end of the telescopic pole.

8. The method of claim 7, wherein the ball casing of the second ball joint comprises an internal surface configured to engage an external surface of the ball of the second ball joint, wherein the second ball joint further comprises a circumferential groove on an upper section of a wall of the ball casing, wherein the ball is configured to rotate within the ball casing and engage the stem in the circumferential groove, and wherein the ball casing further comprises a friction knob configured to one of progressively tighten and progressively loosen the rotatable movement of the ball.

9. The method of claim 1, wherein the tripod comprises a hub, and wherein bottom end of the hub is configured to attach the flexible legs.

10. The method of claim 9, wherein a base of the second ball joint further comprises a screw hole configured to receive a screw projecting perpendicularly from the top end of the hub of the tripod.

11. The method of claim 1, wherein the telescopic pole comprises a first pole and a second pole, wherein the first pole is configured to slidably engage with the second pole, wherein an upper end of the second pole comprises a clamp configured to secure the first pole with the second pole.

12. The method of claim 1, wherein the support surface is even or uneven.

13. The method of claim 12, wherein the support surface is a chair or a bed.

* * * * *